United States Patent
Guen

(10) Patent No.: US 10,115,946 B2
(45) Date of Patent: Oct. 30, 2018

(54) SECONDARY BATTERY

(71) Applicant: SAMSUNG SDI CO., LTD., Yongin-si, Gyeonggi-do (KR)

(72) Inventor: Minhyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 220 days.

(21) Appl. No.: 15/144,489

(22) Filed: May 2, 2016

(65) Prior Publication Data

US 2017/0098808 A1    Apr. 6, 2017

(30) Foreign Application Priority Data

Oct. 2, 2015   (KR) .................. 10-2015-0139129

(51) Int. Cl.
| | |
|---|---|
| *H01M 2/04* | (2006.01) |
| *H01M 2/06* | (2006.01) |
| *H01M 2/12* | (2006.01) |
| *H01M 2/26* | (2006.01) |
| *H01M 2/22* | (2006.01) |

(Continued)

(52) U.S. Cl.
CPC .......... *H01M 2/1241* (2013.01); *H01M 2/04* (2013.01); *H01M 2/06* (2013.01); *H01M 2/22* (2013.01); *H01M 2/26* (2013.01); *H01M 10/04* (2013.01); *H01M 2/30* (2013.01)

(58) Field of Classification Search
CPC ...... H01M 2/1241; H01M 10/04; H01M 2/22; H01M 2/04; H01M 2/06; H01M 2/26; H01M 2/30

See application file for complete search history.

(56) References Cited

U.S. PATENT DOCUMENTS

| | | | | |
|---|---|---|---|---|
| 2011/0206957 A1* | 8/2011 | Byun | ................... | H01M 2/043 429/56 |
| 2012/0077062 A1* | 3/2012 | Fuhr | .................. | H01M 2/1241 429/56 |
| 2014/0212709 A1* | 7/2014 | Roh | .................... | H01M 2/0217 429/56 |

FOREIGN PATENT DOCUMENTS

| | | |
|---|---|---|
| JP | 7-183017 A | 7/1995 |
| KR | 2003-0053601 A | 7/2003 |
| KR | 10-2006-0027270 A | 3/2006 |

OTHER PUBLICATIONS

Abstract and Machine English Translation of Japanese Patent Publication No. 7-183017 A, dated Jul. 21, 1995, 9 Pages.

* cited by examiner

*Primary Examiner* — Lisa S Park
(74) *Attorney, Agent, or Firm* — Lewis Roca Rothgerber Christie LLP

(57) ABSTRACT

A secondary battery according to one or more embodiments includes an electrode assembly including a first electrode plate including a first electrode tab, a second electrode plate including a second electrode tab, and a separator between the first electrode plate and the second electrode plate, a case including a body accommodating the electrode assembly, a cap plate at an upper portion of the body, and a bottom plate at a lower portion of the body, an electrode terminal including a first electrode terminal electrically connected to the first electrode tab and extending through the cap plate, and a second electrode terminal electrically connected to the second electrode tab via the case and on the cap plate, and a first safety vent in the bottom plate, wherein an exterior surface of the bottom plate defines a gas exhaust groove in communication with the first safety vent.

10 Claims, 7 Drawing Sheets

(51) Int. Cl.
*H01M 10/04* (2006.01)
*H01M 2/30* (2006.01)

ns, in which: "FIG. 1 is a perspective view of a secondary battery according to one or more embodiments of the present invention;

SECONDARY BATTERY

CROSS-REFERENCE TO RELATED APPLICATION

This application claims priority to and the benefit of Korean Patent Application No. 10-2015-0139129, filed on Oct. 2, 2015, in the Korean Intellectual Property Office, the contents of which are herein incorporated by reference in their entirety.

BACKGROUND

1. Field

Embodiments of the present invention relate to a secondary battery.

2. Description of the Related Art

In general, a high-capacity battery is fabricated by winding a large quantity of electrode plates and inserting the wound structure into a can having a given volume. In addition, to increase the amount of active material coated on the electrode plates, the volume occupied by current collectors inside the can should be reduced. However, current collecting efficiency should be maintained to produce a high-output battery. Thus, high-capacity batteries are generally fabricated by forming an electrode tab on the current collector at every turn, thus forming a multi-tab electrode assembly.

Because electrode tabs of the electrode assembly are electrically connected to electrode terminals formed on a top end of a can, a current flow path may be established along a positive electrode terminal, the electrode assembly, and a negative electrode terminal. As such, the electrode assembly is vulnerable to deterioration.

In addition, when a safety vent is formed at the top end of the can to selectively release gases therethrough, heat may be concentrated at the top end of the can due to a high pressure of the released gases. As such, the secondary battery may have reduced safety.

SUMMARY

Embodiments of the present invention provide a secondary battery that can reduce deterioration of the secondary battery by lengthening a current flow path and can enhance safety by including safety vents in distinct locations that may release internal gases when an internal pressure of the secondary battery increases.

The above and other aspects of the present invention will be described in or will become apparent from the following description of exemplary embodiments.

According to an aspect of one or more embodiments of the present invention, a secondary battery includes an electrode assembly including a first electrode plate including a first electrode tab, a second electrode plate including a second electrode tab, and a separator between the first electrode plate and the second electrode plate, a case including a body accommodating the electrode assembly, a cap plate at an upper portion of the body, and a bottom plate at a lower portion of the body, an electrode terminal including a first electrode terminal electrically connected to the first electrode tab and extending through the cap plate, and a second electrode terminal electrically connected to the second electrode tab via the case and on the cap plate, and a first safety vent in the bottom plate, wherein an exterior surface of the bottom plate defines at least one gas exhaust groove in communication with the first safety vent.

In addition, the secondary battery may further include a second safety vent in the cap plate.

A thickness of the first safety vent may be less than a thickness of the second safety vent.

The first electrode tab may extend from the electrode assembly toward the cap plate, and the second electrode tab may extend from the electrode assembly toward the bottom plate.

The bottom plate may define a first opening, the first safety vent may include a cover vent coupled to bottom plate at the first opening and defining a first vent opening, and a first vent plate coupled to the cover vent at the first vent opening, and an exterior surface of the cover vent may define a second gas exhaust groove in communication with the first gas exhaust groove.

The second electrode tab may be electrically connected to the cover vent.

The secondary battery may further include an auxiliary electrode tab electrically connecting the second electrode tab and the cover vent.

The second electrode tab may define a second opening, the auxiliary electrode tab may define a third opening, and the second opening and the third opening may be arranged over the first vent plate.

The first gas exhaust groove may extend from an edge of the first safety vent to an edge of the bottom plate.

The first gas exhaust groove may extend across the first safety vent.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION

Figure 1:
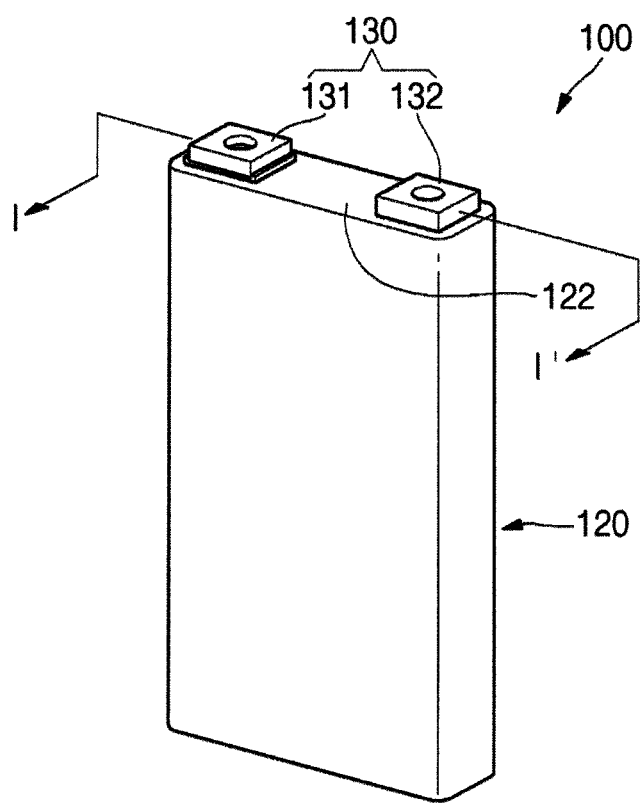
FIG. 1 is a perspective view of a secondary battery according to one or more embodiments of the present invention.

Hereinafter, examplary embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
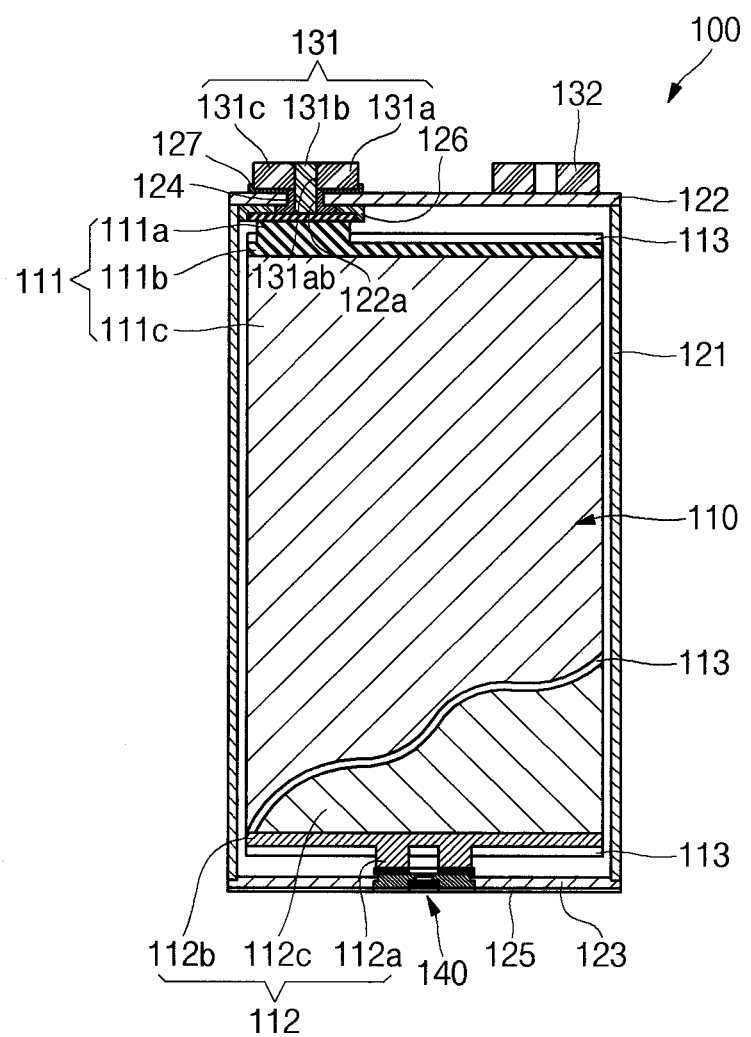
FIG. 2 is a cross-sectional view taken along the line I-I' of FIG. 1.
Figure 3:
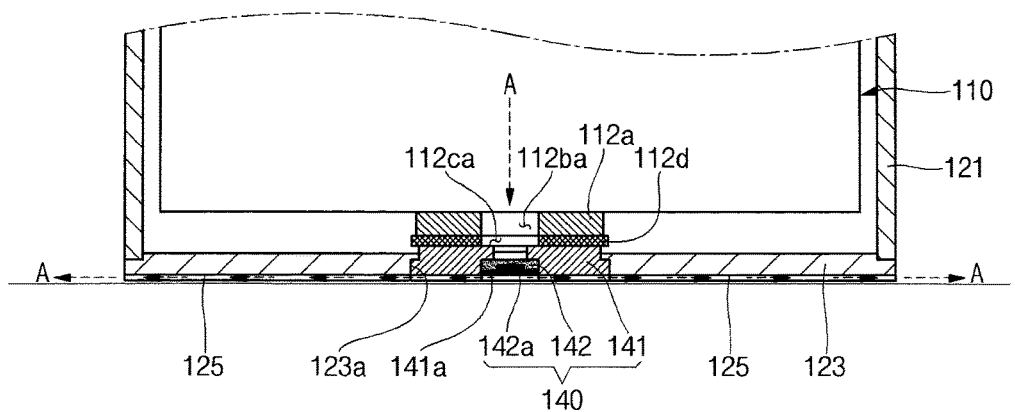
FIGS. 3-4 are cross-sectional views illustrating a configuration of a first safety vent and a gas exhaust path shown in FIG. 2.
Figure 4:
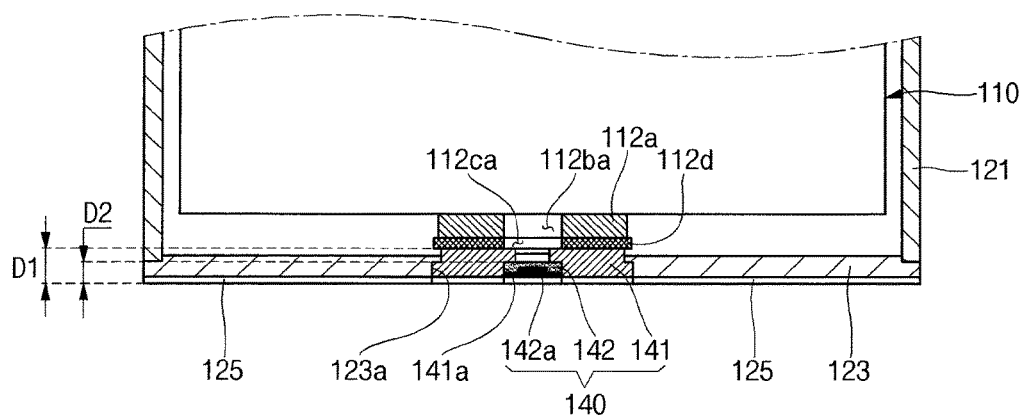
Figure 5:
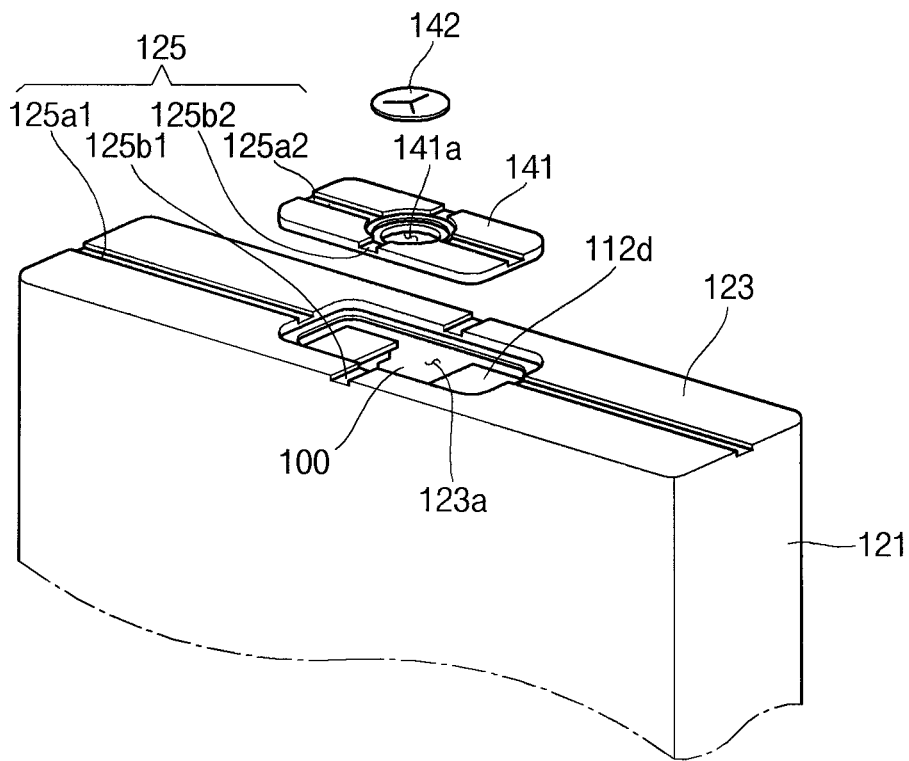
FIG. 5 is a partially exploded perspective view illustrating a bottom portion of a case, a first safety vent, and a bottom plate according to one or more embodiments of the present invention.
Figure 6:
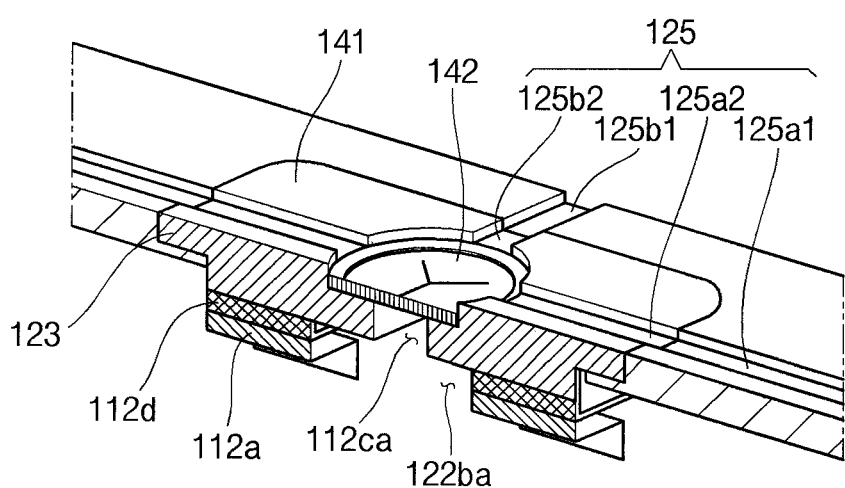
FIG. 6 is a partial cross-sectional view illustrating a bottom plate and a first safety vent according to one or more embodiments of the present invention.

FIG. 1 is a perspective view of a secondary battery according to one or more exemplary embodiments of the present invention, FIG. 2 is a cross-sectional view taken along the line I-I' of FIG. 1, and FIGS. 3-4 are cross-sectional views illustrating a configuration of a first safety vent and a gas exhaust path shown in FIG. 2, FIG. 5 is a partially exploded perspective view illustrating a bottom portion of a case, the first safety vent, and a bottom plate according to one or more exemplary embodiments of the present invention, and FIG. 6 is a partial cross-sectional view illustrating the bottom plate and the first safety vent according to one or more exemplary embodiments of the present invention.

Referring to FIGS. 1-6, the secondary battery 100 according to one or more exemplary embodiments of the present invention includes an electrode assembly 110, a case 120, an electrode terminal 130 and a first safety vent 140.

The electrode assembly 110 may include a first electrode plate 111, a second electrode plate 112 and a separator 113.

The first electrode plate 111 is formed by applying a first electrode active material 111c, such as graphite or carbon, on a first electrode collector 111b including a metal foil, such as a nickel or a copper foil. The first electrode plate 111 may include a plurality of first electrode tabs 111a extending and protruding toward a cap plate 122 from a region of the first electrode current collector 111b where the first electrode active material 111c is not coated. The first electrode tabs 111a are aligned (e.g., are aligned at a predetermined position) through a winding process for fabricating the electrode assembly 110, thereby forming a multi-tab structure. The first electrode tabs 111a are electrically connected to a first electrode terminal 131 and may provide a current flow path (or passage or pathway) between the first electrode plate 111 and the first electrode terminal 131.

The second electrode plate 112 is formed by applying a second electrode active material 112c, such as a transition metal oxide, on a second electrode collector 112b including a metal foil, such as an aluminum foil. The second electrode plate 112 may include a plurality of second electrode tabs 111a extending and protruding toward a bottom plate 123 from a region of the second electrode current collector 112b where the second electrode active material 112c is not coated. Accordingly, the first electrode tabs 111a and the second electrode tabs 112a may extend in opposite directions. The second electrode tabs 112a are aligned (e.g., are aligned at a predetermined position) through a winding process for fabricating the electrode assembly 110, thereby forming a multi-tab structure. The second electrode tabs 112a are electrically connected to the case 120 and may provide a current flow path between the second electrode plate 112 and the case 120.

The separator 113 may be interposed between the first electrode plate 111 and the second electrode plate 112 to prevent or reduce a short circuit and to allow movement of ions, such as lithium ions. The separator 113 has a greater width than the first electrode plate 111 and the second electrode plate 112, such that the separator 113 upwardly and downwardly protrudes (or extends) beyond the first electrode plate 111 and the second electrode plate 112. Therefore, the separator 113 may prevent the first electrode plate 111 and the second electrode plate 112 from directly contacting an interior surface of the case 120 in upper and lower directions of the electrode assembly 110.

As described above, the first electrode plate 111 may function as a negative electrode and the second electrode plate 112 may function as a positive electrode. However, the present invention is not limited thereto, and in some embodiments, the first electrode plate 111 may function as a positive electrode and the second electrode plate 112 may function as a negative electrode.

The case 120 may be made of a conductive metal, for example, aluminum, an aluminum alloy, and/or nickel-plated steel, and may have a substantially hexahedral shape. The case 120 may include a body 121, the cap plate 122 and the bottom plate 123.

The body 121 may have a rectangular tube shape having top and bottom openings, and may form an accommodation space for accommodating the electrode assembly 110.

The cap plate 122 may be coupled to a top (or upper) end of the body 121 to seal the top opening of the body 121. A first terminal opening (e.g., a first terminal hole) 122a may be formed at one edge of the cap plate 112. A first electrode pin 131b of the first electrode terminal 131 may be inserted into and penetrate through the first terminal opening 122a.

The bottom plate 123 may be coupled to a bottom (or lower) end of the body 121 to seal the bottom opening of the body 121. The first safety vent 140 may be provided at or near the center of the bottom plate 123. Because the bottom plate 123 contacts a mounting surface on which the secondary battery 100 may be arranged or positioned, internal gases generated in the case 120 may not be able to be properly released when the first safety vent 140 operates. However, in the secondary battery 100 according to one or more embodiments of the present invention, a plurality of first gas exhaust grooves 125a1 and 125b1 having a depth (e.g., a predetermined depth) are defined in the exterior surface of the bottom plate 123, which contacts the mounting surface, and are in communication with (or connected to) the first safety vent 140. As such, the gases generated in the case 120 may be released (e.g., smoothly released) to the outside of the case 120 along the gas exhaust path established by the first gas exhaust grooves 125a1 and 125b1 and the mounting surface when the first safety vent 140 operates.

The first gas exhaust grooves 125a1 and 125b1 extend from an edge of the first safety vent 140 to an edge of the bottom plate 123 and may be configured to extend across (or cross) the first safety vent 140. The first gas exhaust grooves 125a1 and 125b1 are described further below with reference to the first safety vent 140.

The interior surface of the case 120 may be insulated so that the case 120 is electrically insulated from the electrode assembly 110.

The electrode terminal 130 may include the first electrode terminal 131 and a second electrode terminal 132.

The first electrode terminal 131 may be coupled to the cap plate 122 and may be electrically connected to the first electrode tabs 111a. The first electrode terminal 131 may include a first lower terminal plate 131a, the first electrode pin 131b and a first upper terminal plate 131c.

A bottom (or lower) surface of the first lower terminal plate 131a may be electrically connected the first electrode tabs 111a, and a top (or upper) surface of the first lower terminal plate 131a may be coupled to the first electrode pin 131b. In addition, the first lower terminal plate 131a may be electrically insulated from the interior surface of the case 120 by a lower insulation member 126.

A lower portion of the first electrode pin 131b may be coupled to the first lower terminal plate 131a. An upper portion of the first electrode pin 131b may pass through the first terminal opening 122a defined in the cap plate 122 and may protrude to the outside of the case 120. After the first electrode pin 131b is inserted into a second terminal opening (e.g., a second terminal hole) 131ab of the first upper terminal plate 131c, the first electrode pin 131b may be riveted to be coupled to the second terminal opening 131ab. A seal gasket 124 may be inserted into the first terminal opening 122a together with (e.g., to surround) the first electrode pin 131b. The seal gasket 124 may insulate the first electrode pin 131b from the cap plate 122 while sealing the first terminal opening 122a.

The first upper terminal plate 131c is disposed on the cap plate 122 and may be electrically insulated from the cap plate 122 by an upper insulation member 127. A stepped portion may be formed at an upper edge of the upper insulation member 127. The stepped portion may protrude away from an upper surface of the cap plate 122 to surround a portion of a lower side surface of the first upper terminal plate 131c and may fix the first upper terminal plate 131c to prevent or reduce rotation thereof.

The second electrode terminal 132 may be coupled to the cap plate 122 and may be electrically connected to the second electrode tabs 112a via the case 120. The second electrode terminal 132 may have the same or substantially the same configuration as the first upper electrode plate 131c.

The first safety vent 140 may be installed in (or at) a first opening 123a in the bottom plate 123. The first safety vent 140 may include a cover vent 141 and a first vent plate 142.

The cover vent 141 may be coupled to the first opening 123a to seal the first opening 123a and may be made of the same or substantially the same material as the bottom plate 123.

A first vent opening (e.g., a first vent hole) 141a may be at or near the center of the cover vent 141 and the first vent plate 142 may be coupled to the first vent opening 141a.

In addition, second gas exhaust grooves 125a2 and 125b2, which are respectively connected to the first gas exhaust grooves 125a1 and 125b1, may be defined in an exterior surface of the cover vent 141. For example, as shown in FIG. 5, the first gas exhaust grooves 125a1 and 125b1 crossing (or traversing) the first safety vent 140 in first and second directions (e.g., length and width directions, respectively) are defined in the exterior surface of the bottom plate 123. In addition, the second gas exhaust grooves 125a2 and 125b2 may be respectively connected to (or aligned with) the first gas exhaust grooves 125a1 and 125b1 and may be defined in the exterior surface of the cover vent 141. The gas exhaust grooves 125a1, 125b1, 125a2 and 125b2 may be in communication with (or connected to) the first vent plate 142 so that high-pressure gases within the case 120 may be smoothly released when the first vent plate 142 operates.

The cover vent 141 may be thicker than the first vent plate 142. For example, a thickness D1 of the cover vent 141 may be approximately 0.3 mm.

The cover vent 141 may be electrically connected to the second electrode tabs 112a. To increase a coupling force between the cover vent 141 and the second electrode tabs 112a, an auxiliary electrode tab 112d that connects the cover vent 141 and the second electrode tabs 112a to each other may be provided between the cover vent 141 and the second electrode tabs 112a.

A second opening 112ba may be formed in the second electrode tabs 112a and a third opening 112ca may be formed in the auxiliary electrode tab 112d. The second opening 112ba and the third opening 112ca are formed to correspond to the first vent plate 142 so that an internal gas A of the case 120 may be released (e.g., smoothly released or discharged) through the first vent opening 141a when the first vent plate 142 operates.

The gas exhaust groove 125 may establish a gas exhaust path, together with the mounting surface, when the bottom plate 123 and the mounting surface contact each other. For example, when the internal pressure of the case 120 exceeds a first pressure (e.g., a predefined first pressure), the first vent plate 142 may be ruptured due to a first notch 142a, so that the first vent opening 141a is opened. As such, as shown in FIG. 3, the gas A (e.g., a high-pressure gas) accumulated in the case 120 may be released through the first vent opening 141a and exhausted to the outside of the case 120 along the gas exhaust path established by the gas exhaust groove 125 and the mounting surface.

The first vent plate 142 may be coupled to the first vent opening 141a. The first notch 142a may be formed on a top surface of the first vent plate 142 to allow the first vent plate 142 to be opened at the first pressure.

The first vent plate 142 may be thinner than the cover vent 141. For example, a thickness D2 of the first vent plate 142 may be approximately 0.15 mm.

Figure 7:
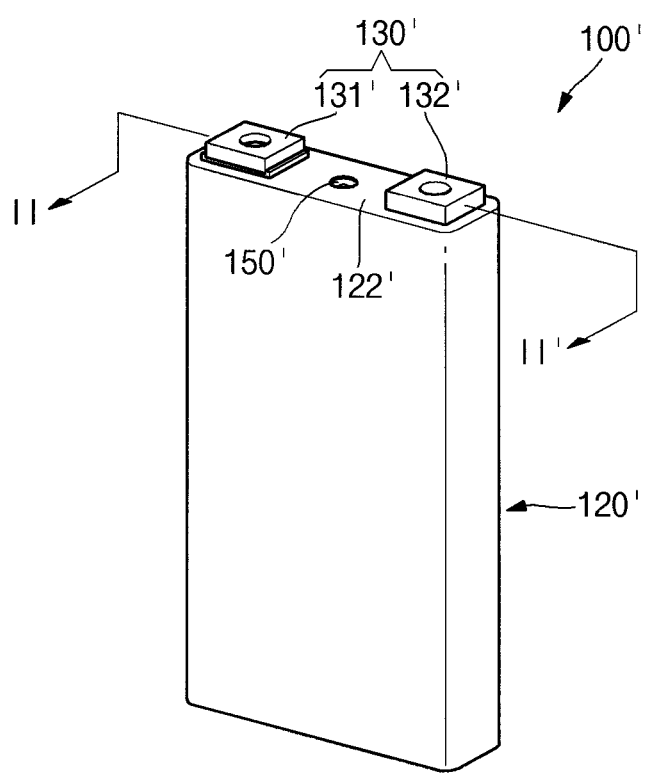
FIG. 7 is a perspective view of a secondary battery according to one or more embodiments of the present invention.
Figure 8:
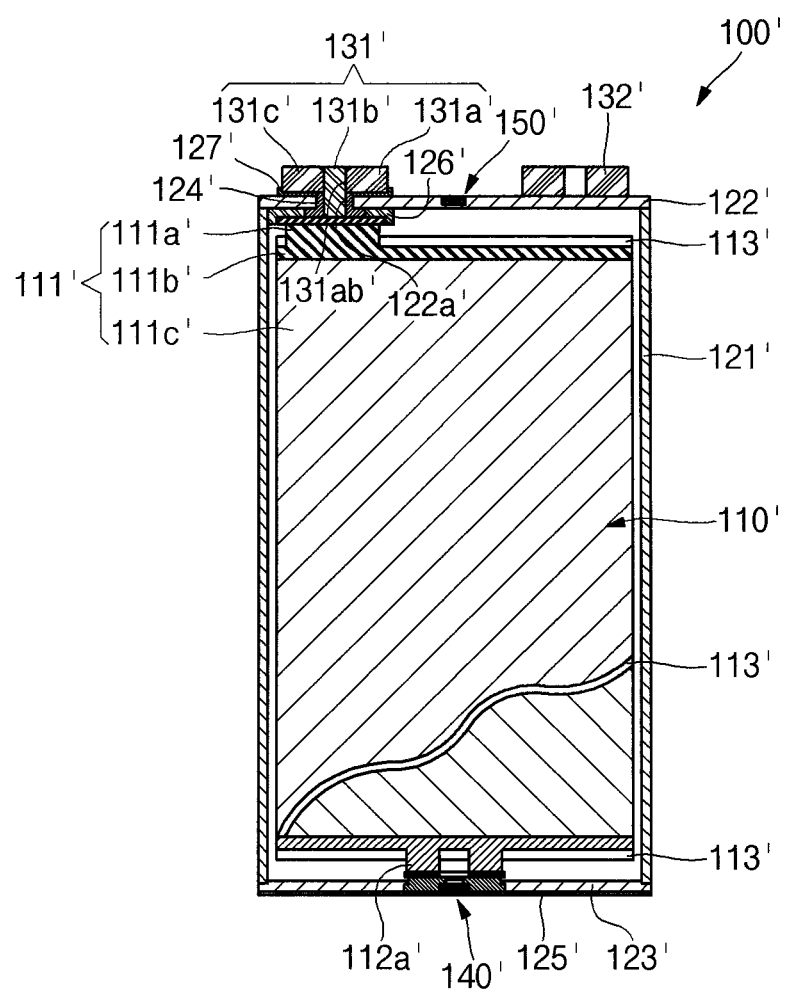
FIG. 8 is a cross-sectional view taken along the line II-II' of FIG. 7.
Figure 9:
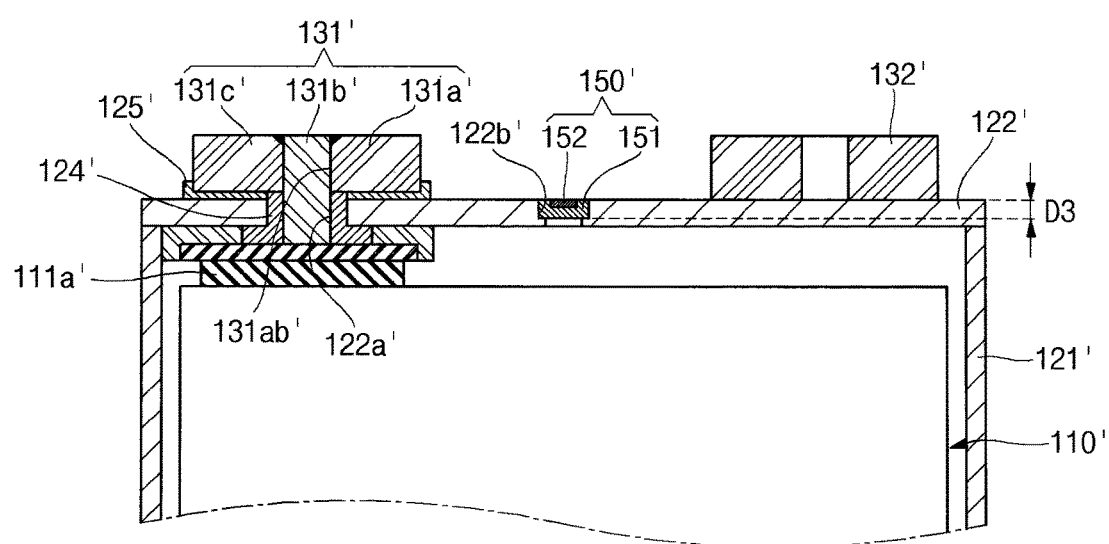
FIG. 9 is a perspective view illustrating a top portion of the secondary battery shown in FIG. 8.

FIG. 7 is a perspective view of a secondary battery according to one or more exemplary embodiments of the present invention, FIG. 8 is a cross-sectional view taken along the line II-II' of FIG. 7, and FIG. 9 is a perspective view illustrating a top portion of the secondary battery shown in FIG. 8.

The secondary battery 100' shown in FIGS. 7-9 has a similar configuration to that of the secondary battery 100 according to one or more exemplary embodiments described above, except that a second safety vent 150' is installed in a cap plate 122', as shown in FIGS. 7-9.

The second safety vent 150' is installed in (or at) a second vent opening (e.g., a second vent hole) 122b' formed at (or near) the center of the cap plate 122' and may include a second vent plate 151 having a second notch 152.

When the internal pressure of the case 120' exceeds a second pressure (e.g., a predefined second pressure), the second vent plate 151 may be ruptured due to the second notch 152, so that the second vent opening 122b' opens. Accordingly, the internal gas accumulated in the case 120 may be released (or exhausted) through the second vent opening 122b'.

The second pressure may be greater than the first pressure. Accordingly, the first safety vent 140 may operate earlier than the second safety vent 150 at the first pressure, and when (or if) the internal pressure of the case 120 reaches the second pressure, the second safety vent 150' may operate. As such, a thickness D3 of the second vent plate 151 may be greater than the thickness D2 of the first vent plate 142. For example, when the thickness D2 of the first vent plate 142 is approximately 0.15 mm, the thickness D3 of the second vent plate 151 may be approximately 0.2 mm.

Because the secondary battery 100' according to one or more exemplary embodiments has substantially the same configuration as the secondary battery 100 described above, except for a configuration of the second safety vent 150, additional description of the secondary battery 100' is omitted.

According to one or more exemplary embodiments of the present invention, a safety vent is formed in a bottom surface of a case which contacts a mounting surface, thereby preventing or reducing the likelihood of thermal runaway due to heat generation concentrated at (or on) electrode terminals by high-pressure exhaust gas.

In addition, gas exhaust grooves which communicate with the safety vent are defined in the bottom surface of the case, thereby facilitating smooth gas exhaustion.

Further, the electrode tabs extend in different directions, and one of the electrode tabs is electrically connected to the case to lengthen a current flow path, thereby reducing (or minimizing) the likelihood of deterioration of the electrode assembly.

Additionally, another safety vent is provided in the cap plate that may operate when the safety vent in the bottom surface of the case does not properly operate, thereby enhancing the safety of the secondary battery.

While the present invention has been particularly shown and described with reference to exemplary embodiments thereof, it will be understood by those of ordinary skill in the art that various changes in form and details may be made therein without departing from the spirit and scope of the present invention, as defined by the following claims and their equivalents.

What is claimed is:

1. A secondary battery comprising:
    an electrode assembly comprising:
        a first electrode plate comprising a first electrode tab;
        a second electrode plate comprising a second electrode tab; and
        a separator between the first electrode plate and the second electrode plate;
    a case comprising:
        a body accommodating the electrode assembly;
        a cap plate at an upper portion of the body; and
        a bottom plate at a lower portion of the body;
    an electrode terminal comprising:
        a first electrode terminal electrically connected to the first electrode tab and extending through the cap plate; and
        a second electrode terminal electrically connected to the second electrode tab via the case and on the cap plate; and
    a first safety vent in the bottom plate,
    wherein an exterior surface of the bottom plate defines first gas exhaust grooves in communication with the first safety vent, one of the first gas exhaust grooves extending from the first safety vent to an outer perimeter of the bottom plate.

2. The secondary battery of claim 1, further comprising a second safety vent in the cap plate.

3. The secondary battery of claim 2, wherein a thickness of the first safety vent is less than a thickness of the second safety vent.

4. The secondary battery of claim 1, wherein the first electrode tab extends from the electrode assembly toward the cap plate, and wherein the second electrode tab extends from the electrode assembly toward the bottom plate.

5. A secondary battery comprising:
an electrode assembly comprising:
   a first electrode plate comprising a first electrode tab;
   a second electrode plate comprising a second electrode tab; and
   a separator between the first electrode plate and the second electrode plate;
a case comprising:
   a body accommodating the electrode assembly;
   a cap plate at an upper portion of the body; and
   a bottom plate at a lower portion of the body;
an electrode terminal comprising:
   a first electrode terminal electrically connected to the first electrode tab and extending through the cap plate; and
   a second electrode terminal electrically connected to the second electrode tab via the case and on the cap plate; and
a first safety vent in the bottom plate,
wherein an exterior surface of the bottom plate defines a first gas exhaust groove in communication with the first safety vent,
wherein a first opening is in the bottom plate,
wherein the first safety vent comprises:
   a cover vent coupled to the bottom plate at the first opening, and defining a first vent opening; and
   a first vent plate coupled to the cover vent at the first vent opening, and
wherein an exterior surface of the cover vent defines a second gas exhaust groove in communication with the first gas exhaust groove.

6. The secondary battery of claim 5, wherein the second electrode tab is electrically connected to the cover vent.

7. The secondary battery of claim 6, further comprising an auxiliary electrode tab electrically connecting the second electrode tab and the cover vent.

8. The secondary battery of claim 7, wherein a second opening is in the second electrode tab,
wherein a third opening is in the auxiliary electrode tab, and
wherein the second opening and the third opening are arranged over the first vent plate.

9. The secondary battery of claim 1, wherein one of the first gas exhaust grooves extends from an edge of the first safety vent to an edge of the bottom plate.

10. The secondary battery of claim 1, wherein one of the first gas exhaust grooves bisects the bottom plate along a first direction.

* * * * *